Oct. 21, 1958 J. P. KLEIBER 2,857,476

SYSTEM OF ELECTRO-MAGNETIC RECORDING

Filed July 22, 1953

INVENTOR.
JOSEPH P. KLEIBER
BY Howard S. Jeandron
ATTORNEY

United States Patent Office 2,857,476
Patented Oct. 21, 1958

2,857,476

SYSTEM OF ELECTRO-MAGNETIC RECORDING

Joseph P. Kleiber, Yonkers, N. Y.

Application July 22, 1953, Serial No. 369,631
4 Claims. (Cl. 179—100.2)

Figure 1:
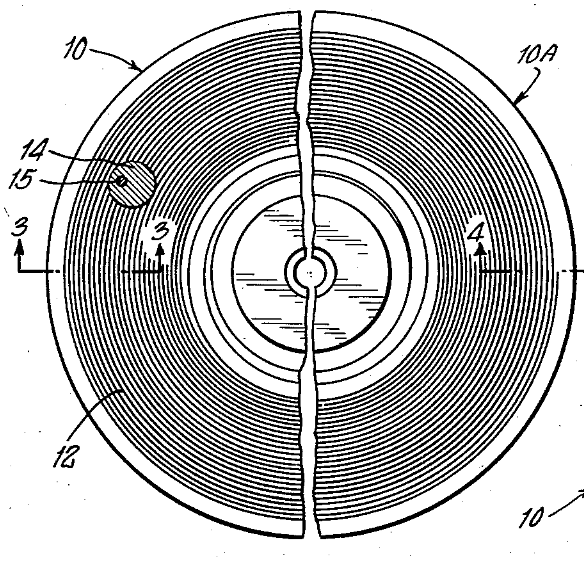

This invention relates to sound recording and reproducing and more particularly to a system of laying down sound intelligence on a magnetically coated disc or cylinder. In the past there have been a number of different attempts at electro-magnetic recording. In the one instance, the recording is imposed upon a wire, in another instance, it is imposed upon a magnetic tape and in the third instance it is imposed upon a disc or cylinder. This invention is primarily concerned with the recording of an electro-magnetic sound track on a disc or cylinder. Various attempts have been made to guide the recording head over the surface of the disc or cylinder to obtain a high fidelity recording in a minimum of space. One such system employs a pivotal arm supporting the recording head and a guide pin mounted in the arm, the guide pin riding in a grooved helix in the center of the record so that the magnetic recording is imposed on the outer surface of the disc beyond the grooved helix. Attempts have also been made to produce a modulated spiral or helix on a disc. In this invention there is provided a guided head or pole piece for a magnetic recording or pick-up with an unmodulated spiral or helix formed in the disc or cylinder. With the proper recording head or pole piece simply guided through an unmodulated spiral or helix, a high fidelity reproduction may be obtained.

It is an object of this invention to provide a disc with an unmodulated spiral to guide a recording head to reproduce an electro-magnetic recording over the entire available area of both sides of the disc.

A further object of this invention is to provide a low permeability metal disc with a coating of magnetizable material and binder and in which an unmodulated spiral is formed in the surface of the disc as a guided path for an electro-magnetic recording head.

A still further object of this invention is to provide a low permeability metal disc with a coating of magnetizable material and binder and in which an unmodulated spiral is formed on the surface of the disc as a guided path for an electro-magnetic recording head.

A still further object of this invention is to provide a high permeability metal disc in which an unmodulated spiral groove is formed to provide a guided path for an electro-magnetic recording head.

A further object of this invention is to provide a low permeability metal disc with a coating of iron oxide and binder and in which an unmodulated spiral is formed to provide a guided path for an electro-magnetic recording head.

A further object of this invention is to provide a plastic disc with a coating of iron oxide and binder on both sides thereof and in which an unmodulated spiral is formed on both sides thereof to provide a guided path for an electro-magnetic recording head.

A still further object of this invention is to provide a low permeability metal disc with a coating of iron oxide and binder and in which an unmodulated spiral or groove is formed to provide a guided path for an electro-magnetic recording head and in which two or more electro-recording heads are connected on the same recording arm so that one recording head will record on the surface of the spiral groove while the other head records on the land situated between the successive formations of the spiral groove.

A still further object of this invention is to provide a low permeability metal disc in which a spiral groove is formed and filled with a high permeability material such as iron oxide and in which an electro-magnetic recording head is provided with a permanent magnet so that the electro-magnetic head will be guided along the path of the high permeability spiral formed in the disc to record over the entire length of the spiral.

Figure 2:
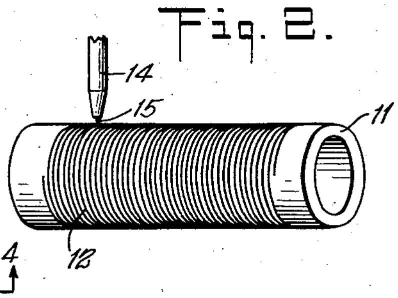
Figure 3:
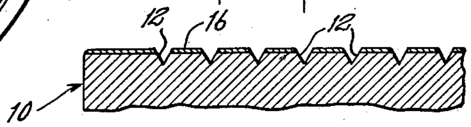
Figure 4:
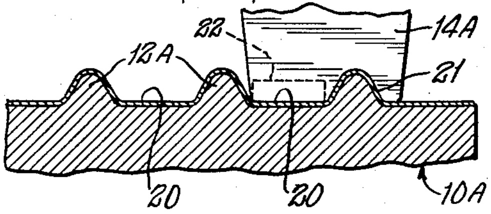
Figure 5:
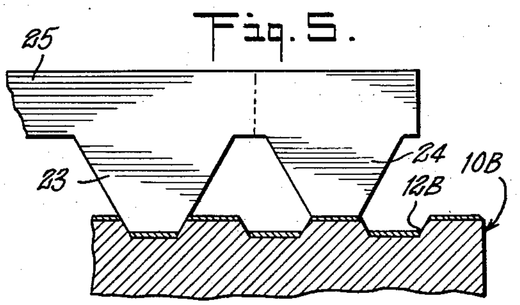
Figure 6:
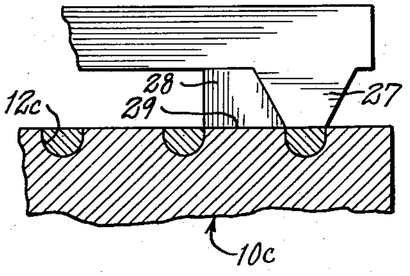
Figure 7:
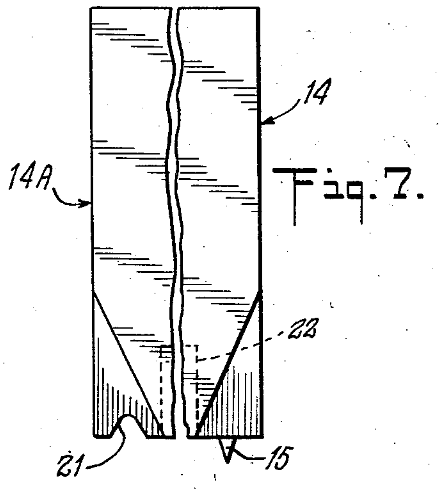

Other objects of this invention will be apparent by reference to the accompanying detailed description and the drawings in which Fig. 1 is an illustration of a plan view of a disc with a spiral formed therein, Fig. 2 is an elevation view of a cylinder with a helix formed thereon, Fig. 3 is a partial cross sectional view taken on line 3—3 of Fig. 1 showing one side of the record, Fig. 4 is a partial cross sectional view taken on line 4—4 of Fig. 1 showing the opposite side of the record, Fig. 5 is a further embodiment of this invention illustrating a cross sectional view of a disc in combination with a pair of recording pole pieces, Fig. 6 is a still further embodiment of this invention illustrating a cross sectional view of a portion of a disc in combination with a recording head, and Fig. 7 illustrates an elevation view of an electro-magnetic recording head provided with guiding means.

Referring to the drawings and particularly Fig. 1, there is illustrated a disc 10 which may be a recording blank with a spiral groove formed on either or both surfaces of the disc and an iron oxide and binder mixed and coated on either or both surfaces of said disc. The disc 10 may also be constructed as a low permeability metal disc with a spiral groove formed on either or both surfaces thereof and similarly coated by any suitable method or process a coating of a magnetizable material such as a powder iron oxide retained in a binder or a third modification of the disc 10 is to form the disc of a high permeability metal without any coating and with a spiral groove formed on either or both surfaces thereof. It is apparent that an electro-magnetic head 14 may be positioned on the surface of the disc 10 to impose an electro-magnetic recording thereon. The head 14 will be provided with a guide 15 so that the guide 15 will follow the spiral groove formed in the surface of the disc 10 during the rotation of disc 10 for a recording. It is apparent that disc 10 may be positioned on any turntable as is standard in the art and rotated at the usual speeds. The size of the disc, also the speed of the turntable, may vary according to the desired length of recording.

Referring to Fig. 2 there is illustrated a cylinder 11. The cylinder 11 may be formed of any of the materials used for records. Likewise the cylinder may be formed of a low permeability metal. A groove 12 is formed in the shape of a helix on the surface of the cylinder 11. It is to be noted that this is a conventional phonograph groove—unmodulated. In both examples whether plastic or low permeability metal, the cylinder may be coated on its outer surface with a powdered iron oxide and binder to prepare the cylinder for recording with an electromagnetic recording head. Similarly the cylinder 11 may be formed of a high permeability metal with a groove formed as a helix 12 over its entire surface. The spiral is formed with a predetermined pitch with a suitable width of land between threads of the spiral. The cylinder 11 for recording is placed in a device (not shown) to be rotated while an electro-magnetic head 14 may bear upon the surface of the cylinder 11 and a guide 15 in the bearing surface of the head will follow the groove 12 to thus move the electro-magnetic head along the entire surface of the cylinder 11 in the form of a helix. Thus the electro-magnetic head 14 may impose an electro-magnetic recording in the high permeability coating formed on the cylinder 11.

Referring to Fig. 3 there is illustrated a partial cross sectional view of one side of the disc 10 in which the spiral groove 12 is formed or cut and in which a magnetic surface 16 has been provided on the lands situated between the successive formations of the spiral groove 12. Regardless of the land width between threads of the spiral, it is possible to move the pick-up gap to the very edge of the land. The land may vary, that is, it may be of any width as long as the width is sufficient to provide suitable recording and play back intelligence and time. This magnetic surface is preferably of a high permeability material such as iron oxide and the iron oxide in powdered form may be mixed with a binder and applied on the surface to adhere to the surface of the record. Although iron oxide is presently used as the magnetic material, the quality, that is, any alloy or more satisfactory magnetic material will permit the same high fidelity recording at a greatly reduced speed. Although there is illustrated a single surface treated record, it is apparent that both surfaces of the record may be similarly treated. With a record or disc formed as illustrated in Fig. 3, the electro-magnetic recording head 14 may be positioned to bear on the magnetic surface 16 and the head 14 will transverse the surface of the record or disc 10 during the rotation of such record and be guided in a spiral path by means of the guide 15 of the head 14.

Referring to Fig. 4 there is illustrated a further embodiment of this invention in which the opposite side of the disc 10A is shown. The disc may be as described above of a plastic material such as cellulose acetate or a low permeability metal disc or a high permeability metal disc. However instead of the spiral groove being cut into the record or disc as above described, the disc may be stamped or cast with a raised spiral groove 12A formed on the surface thereof. In this embodiment of the invention the magnetic surface formed as described above may be coated either over the entire surface or in the portion 20 between the raised parallel sections of the spiral. Likewise, in this embodiment of the invention, the electro-magnetic recording head 14A is formed with a groove 21 in the surface of the head, the groove 21 must be of a similar contour to the raised portion 12A of the disc 10A. Thus the head 14A may rest upon the surface of the disc 10A while the disc 10A is rotated and with the groove 21 of the head 14A following the spiral 12A, the head 14A will be moved over the entire surface of the disc 10A. The head 14A is provided with pole piece 22 so that a recording may be imposed on the magnetic surface during the movement of the head 14A over the disc 10A.

Referring to Fig. 5 there is illustrated a still further embodiment of this invention in which a disc 10B is utilized. The disc 10B may be of any of the materials already described but it is necessary that the magnetic surface of disc 10B cover the surface of the grooves and the lands formed between the successive formation of the spiral. In this embodiment it is proposed that two magnetic pole pieces 23 and 24 be utilized and further that the contour of the bearing end of the pole piece 23 shall be similar to the shape of the groove 12B formed in the disc 10B. Thus with both pole pieces 23 and 24 supported on a single arm 25, it is apparent that during the rotation of the disc 10B, the pole piece 23 will guide both pole pieces over the entire surface of the disc 10B due to the spiral groove 12B. With this combination, an electro-magnetic recording may be imposed on the magnetic surface of the disc 10B by either of the pole pieces 23 or 24 as a single sound track. Or they may be used in combination. Likewise, the pole pieces 23 and 24 may be used in combination such as to divide the frequencies so that the lower frequencies are imposed on one track while the higher frequencies are imposed on the other track. It is apparent, referring to Fig. 5 that although there is illustrated two pole pieces 23 and 24 for a double recording of a single message or two separate recordings simultaneously, it is apparent that the arm 25 may have the pole piece 24 removed and pole piece 23 will continue to guide the arm 25 and may be utilized for a single recording within the spiral groove 12B. Referring to Fig. 6 there is illustrated a disc 10C which may be formed of plastic or low permeability metal and in which a spiral groove 12C is formed. The spiral groove 12C may be filled with a magnetizable material such as the powdered iron oxide and a binder so that the upper surface of disc 10C will be flat. In this embodiment an electro-magnetic recording head 27 may be utilized to impose a message or sound track in the magnetizable material formed in the spiral groove 12C. In order that the electro-magnetic recording head 27 will follow the spiral groove 12C, it is necessary to provide a permanent or electro-magnet 28 attached to the head 27 so that as the disc 10C is rotated, the magnet 28 will follow the land 29 of low permeability material formed between successive formations of the spiral groove 12C. Referring to Fig. 7 there is illustrated the electro-magnet recording head 14. The construction of the head 14 is such that there is a pole piece 22 at the center of the head and either of two variations of the head 14 and 14A may be used as illustrated. That is, when the head 14 is used with the disc 10 of Fig. 3, there is a guiding pin which projects slightly below the surface of the pole piece 22. The pin 15 is situated in a non-magnetic portion of the head which is constructed preferably of a hard non-wearing material as it is the frictional sliding surface that slides over the disc 10, 10A as the case may be. Therefore the least amount of friction is to be preferred. Referring to the portion 14A of Fig. 4, it is similar in construction to the above embodiment except that the non-magnetic portion of the head is formed with a groove 21 therein so that the groove 21 may be fitted to the formation 12A of Fig. 4. Fig. 7 illustrates the type of electro-magnetic head to be utilized with the various embodiments illustrated. However it is to be understood that the pole piece 22 may be a removable pole piece rather than the permanent piece illustrated. Thus with this type of recording or play back head when the pole piece becomes defective, it is easily pulled out of the head 14 and a new pole piece 22 inserted therein. The head is designed to provide a sufficient output level from a normally recorded input signal.

The discs 10, 10A, 10B and 10C are designed similar to a standard phonograph disc to thus permit the play back of these discs on a standard phonograph. That is, a disc 10 as illustrated in Fig. 3 may be used with a standard phonograph and the guide will control the path of the electro-magnetic recording head. Thus it is apparent that with a standard phonograph any grooved record may be coated with a magnetic material and using an electro-magnetic recording head sound intelligence may be imposed upon the record and played back. It is to be understood that although this invention may be adapted to a standard phonograph, likewise discs especially prepared may be used with standard equipment or discs may be especially prepared to be utilized with newly designed players of a predetermined speed and of particular design where other embodiments such as that illustrated in Figs. 5 and 6 are to be considered. Although there is described the electromagnetic recording head as applied to this invention, this invention also contemplates the use of a magnetic arm with a universal head which includes replaceable pole pieces. The pole pieces may be of very low permeability material. The head may be provided with any one of a plurality of types of guides which will follow the spiral path desired. The interchangeable pole pieces may have gap spacings and may be any dimension which will provide suitable recording play back and erase energy. The pole pieces may also be rotating pole pieces or they may be turning over pole pieces, that is, they may be removed, turned over and re-inserted.

Various changes may be made to the discs 10, 10A and 10B such as the shape of the groove or the raised spiral formed thereon without departing from the spirit of this invention and the dimensional spacing between the formations of the spiral may be from a plausible minimum to any desired maximum without departing from the spirit of this invention. The contour of the bearing end of the pole pieces which may be utilized to follow a formed groove may be varied without departing from the spirit of this invention. The number of recorded messages imposed on the surface of a disc at one time as illustrated in Fig. 5 may be increased to any desired plurality without departing from the spirit of this invention. The materials utilized for the formation of the discs and the sound track therein may be varied without departing from the spirit of this invention. The formation of the spiral or helix of a cylinder may be varied without departing from the spirit of this invention and this invention shall be limited only by the appended claims.

What is claimed is:

1. In a device for magnetically recording or reproducing sound, a single layer rotary record disc with an unmodulated spiral groove, a coating of magnetizable material on the surface of said disc, said coating being so fine that it will not fill the spiral groove, a pair of electro-magnetic recording heads so spaced and mounted on one arm that one head fits into the spiral groove while the other head rests on the land between grooves, means to record a sound recording on both the surface of the groove and the land simultaneously.

2. In a device according to claim 1 means to record two separate electro-magnetic sound tracks, one on the groove surface and one on the land surface simultaneously.

3. In a device for magnetically recording or reproducing sound, a rotary record disc with an unmodulated spiral groove, a coating of magnetizable material on the surface of said disc, a pair of removable electromagnet pole pieces mounted in a single head, said pole pieces being so spaced that one pole piece fits into the spiral groove as a guide to follow said groove while the other pole piece fits on the land between grooves.

4. In a device for magnetically recording or reproducing sound, a rotary metal record disc, said disc being composed of a high permeability metal, a pair of removable electro-magnet pole pieces mounted in a single head, said pole pieces being so spaced that one pole piece fits into the spiral groove as a guide to follow said groove while the other pole piece fits on the land between grooves.

References Cited in the file of this patent

UNITED STATES PATENTS

| | | |
|---|---|---|
| 2,361,752 | Eilenberger | Oct. 31, 1944 |
| 2,381,463 | Potter | Aug. 7, 1945 |
| 2,501,126 | Howell | Mar. 21, 1950 |
| 2,517,440 | Kleber | Aug. 1, 1950 |
| 2,721,906 | Sharpe | Oct. 25, 1955 |

FOREIGN PATENTS

| | | |
|---|---|---|
| 512,766 | Great Britain | Nov. 30, 1937 |